United States Patent
Asars

[11] 4,114,070
[45] Sep. 12, 1978

[54] DISPLAY PANEL WITH SIMPLIFIED THIN FILM INTERCONNECT SYSTEM

[75] Inventor: Juris A. Asars, Murrysville, Pa.

[73] Assignee: Westinghouse Electric Corp., Pittsburgh, Pa.

[21] Appl. No.: 780,138

[22] Filed: Mar. 22, 1977

[51] Int. Cl.² .............. H05B 37/00; H05B 39/00; H05B 41/00
[52] U.S. Cl. .............. 315/169 TV; 340/166 EL; 340/324 M; 313/505
[58] Field of Search .............. 313/483, 505; 315/169 R, 169 TV; 340/166 EL, 324 M

[56] References Cited

U.S. PATENT DOCUMENTS

| | | | |
|---|---|---|---|
| 3,877,008 | 4/1975 | Payne | 340/324 M |
| 3,885,196 | 5/1975 | Fischer | 315/169 TV |
| 4,042,854 | 8/1977 | Luo et al. | 315/169 R X |

Primary Examiner—Alfred E. Smith
Assistant Examiner—Robert E. Wise
Attorney, Agent, or Firm—W. G. Sutcliff

[57] ABSTRACT

An electro-optic display panel is described in which thin film electronic circuitry is associated with individual display medium elements disposed upon a substrate. Rows and columns of interconnecting bus bars are minimized by utilizing the bus bars on a time shared basis.

5 Claims, 4 Drawing Figures

DISPLAY PANEL WITH SIMPLIFIED THIN FILM INTERCONNECT SYSTEM

BACKGROUND OF THE INVENTION

A recent development in display technology comprises a flat display panel which includes an array of electro-optic elements disposed as rows and columns upon a substrate with individual thin film electronic control circuitry associated with each of the display elements upon the substrate. Such display panels are set forth and are described in greater detail in copending application Ser. No. 634,216 filed Nov. 21, 1975, now U.S. Pat. No. 4,042,854, and application Serial No. 636,281 filed Nov. 28, 1975, now U.S. Pat. No. 4,006,383, each of which is owned by the assignee of the present invention. A like number of rows and columns of the display medium elements and addressing circuitry bus bar interconnects are provided for each row and column of display elements on such panels. The panels utilize line-at-a-time video information addressing techniques with the video information applied via the column bus bars. The row bus bars are used to apply synchronizing switching signals. There is another set of common bus bars in addition to these addressing sets associated with the rows and columns of the display. This additional set of common bus bars which are really thin film deposits of aluminum or other such conductive metal to another peripheral edge of the panel and typically connected to ground to provide a common reference potential level which is connected to the thin film electronic circuitry associated at each display medium point on the panel. The provision of such common reference signal bus bars increases by one-half the number of bus bars which must be deposited on the panel and doubles the number of crossovers between bus bars which must be insulated relative to one another on the panel. It also requires additional deposition steps through the masking system. These crossover or overlap points between bus bars constitute a major reliability problem area in fabricating such display panels. This is because it is difficult to effectively completely insulate these crossover points. The need for such common reference signal bus bars also contributes to limiting the resolution factor for such display panels. This is because of the need to adequately space all deposited components upon the substrate from one another to maintain isolation between the conductor components of the panel. The less the total number of components, including thin film transistors as well as bus bar elements required for the circuitry, the smaller the total element size can be because of the reduced spacing requirements, which size reduction can contribute to increasing the resolution of the individual display medium.

SUMMARY OF THE INVENTION

The display system of the present invention eliminates the set of common reference signal bus bars. The number of information signal buses which are aligned with the columns of display elements equals the number of columns of display elements, with the information signal buses being peripherally connected to information signal drive means. The number of rows of switching signal buses is equal to one more than the number of rows of display elements to which the switching signal buses are also connected. The switching signal buses are peripherally connectable to switching signal drive means for driving a single row of display elements at a time, with the adjacent row switching signal bus being connectable to reference potential means associated with the power supply drive means for the display elements of the adjacent driven row.

DESCRIPTION OF THE PREFERRED EMBODIMENTS

Figure 1:
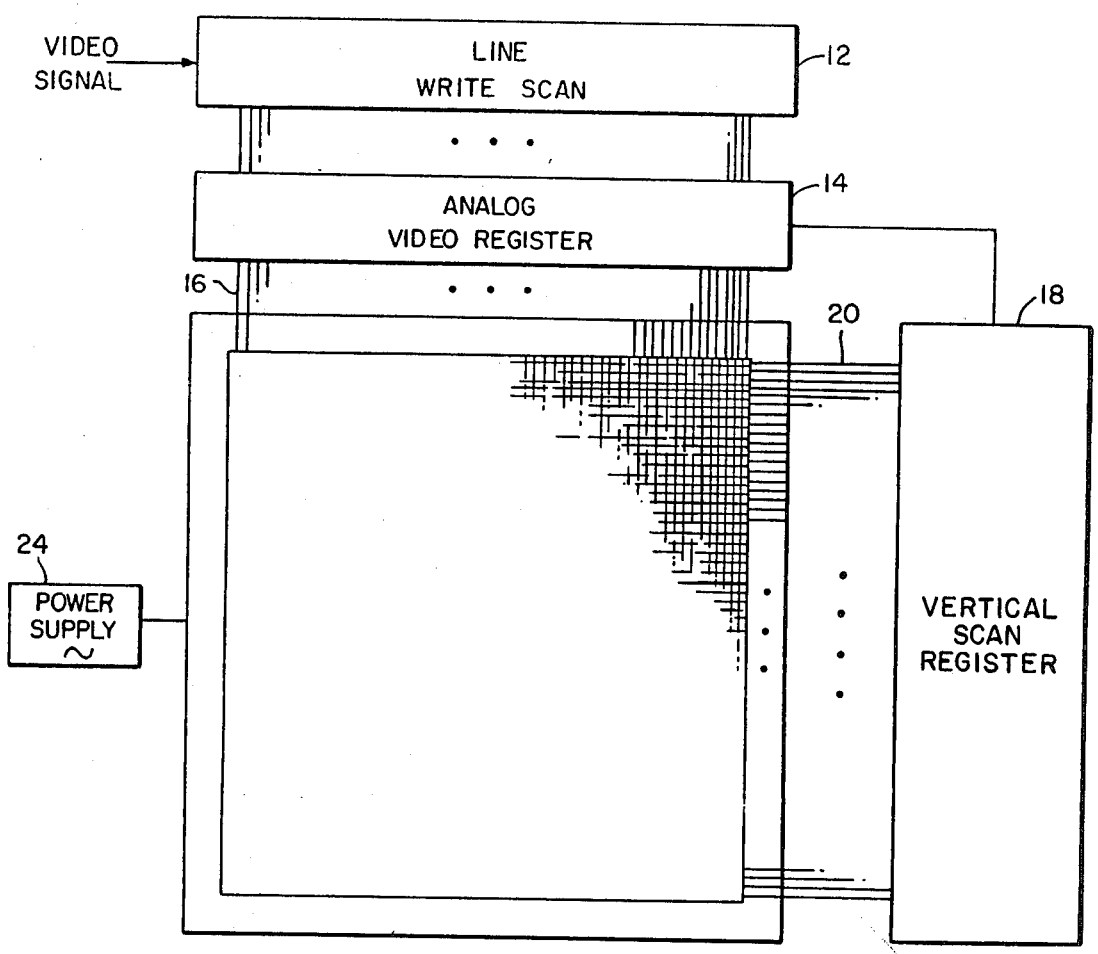
FIG. 1 is an overall schematic representation of the display panel and a peripheral drive signal means for addressing and controlling the display panel operation to provide a visual display.

The display panel system of the present invention is seen in schematic form in FIG. 1. The display panel 10 is connected to peripheral drive circuitry at two sides of the panel. Video information signals are fed in one side of the panel from the line-at-a-time address scheme means 12 and the analog video register 14 which is connected at the panel peripheral to information signal buses 16 which run in parallel columns on the display panel. Vertical scan means 18 is provided on the orthogonal side of the display panel and is connected individually to rows of switching signal bus bars 20 which extend across the display panel orthogonally, normal to the information signal buses 16, with the switching signal buses 20 being insulated from the information signal buses at crossover points by a suitable insulation layer. As will be explained later in greater detail, a uniform light transmissive conductive electrode 22 is disposed over the entire display panel and is connected at a peripheral side to the power supply means 24.

Figure 2:
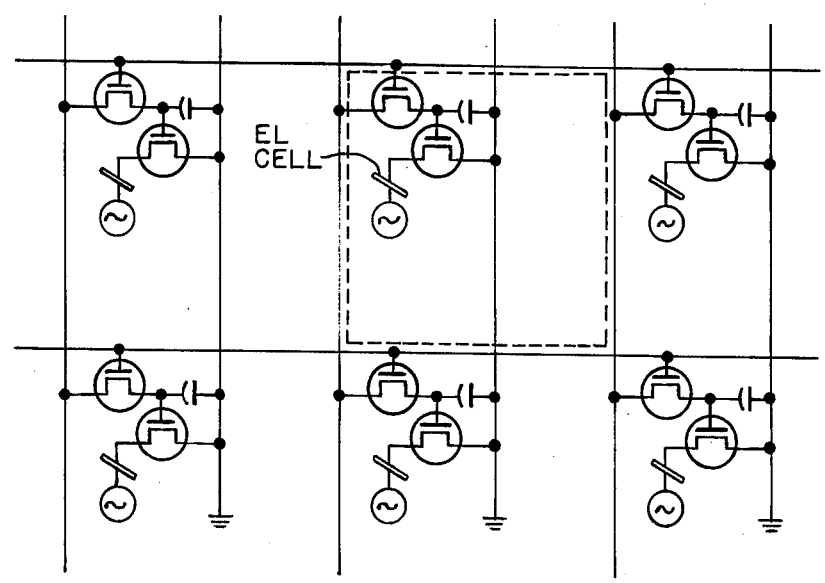
FIG. 2 is a portion of the circuit layout of the prior art display panel.

The display panel 10 actually comprises rows and columns of display medium elements which comprise individual picture points to make up the overall display. This can be best seen in the schematic electrical diagrams of FIG. 2, which is a prior art display panel, and FIG. 3 which is a partial circuit schematic of the display panel of the present invention. In both the prior art panel of FIG. 2 and the present invention panel in FIG. 3, the individual display element is defined between the intersections of adjacent information signal buses and switching signal buses, and generally defined by the area shown in the dotted line in FIGS. 2 and 3. The basic electronic control circuitry for both panels is essentially the same and is explained in greater detail in the aforementioned copending patent applications. The circuitry consists of a switching transistor $T_1$ which is a thin film transistor, the gate of which is connected to the switching signal bus to permit information signals applied via bus 16 and the source of switching signal transistor $T_1$ to be transferrred and loaded in the storage capacitor $C_s$. The power drive transistor $T_2$ has its gate connected to the drain of $T_1$, and to the storage signal side of capacitor $C_s$. One side of the power transistor $T_2$ is connected to individual electrodes 23 which are part of each display element. The preferred display medium is electroluminescent phosphor which is disposed upon the electrode 23 at each display element, and the uniform top electrode 22 discussed above is disposed over the electroluminescent layer. This top electrode 22 is connected to the power supply means 24 for driving the electroluminescent phosphor to produce light output. In the prior art display panel embodiment, it was necessary to utilize a common reference signal bus which was connected to the power transistor $T_2$ and to the other side of the storage capacitor $C_s$ and was typically grounded to permit referencing the information signal level to a fixed potential level for the entire display panel. Such a grounded or reference signal bus bar permitted a power return path to the power supply means to provide a complete circuit across the electroluminescent layer electrodes. The inclusion of this common reference signal bus bar significantly increases the number of bus bar crossovers and reduces the available spacing for separating components on the panel within an area covered by a single display element. This has the effect of placing a limit on the resolution of display panel since it makes it difficult to reduce the size of the individual display elements.

Figure 3:
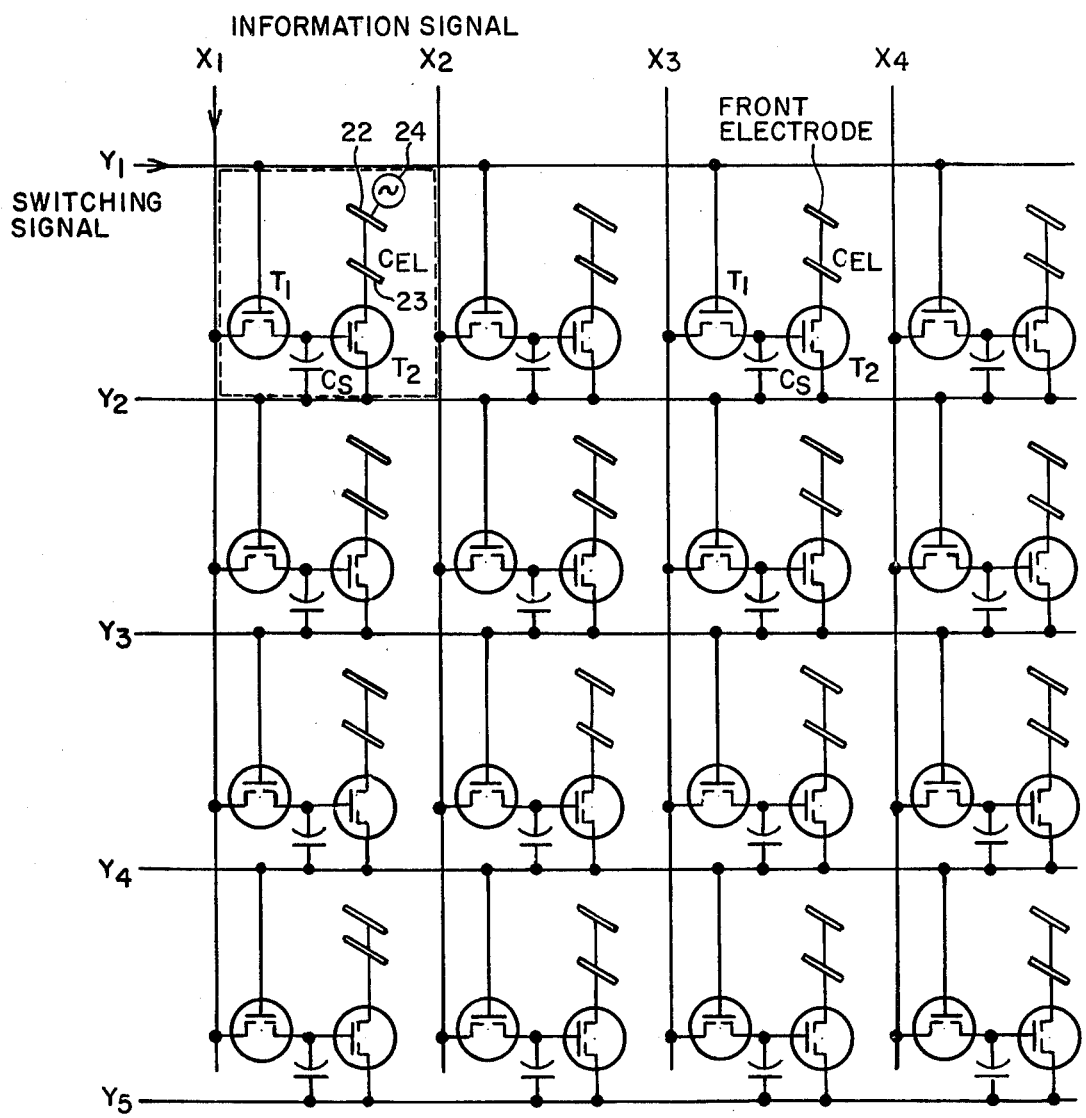
FIG. 3 is a partial circuit schematic of the display panel of the present invention.

In the display panel system of the present invention as seen in FIG. 3, the basic display element format is essentially the same, with switching transistor $T_1$ connected in the same manner as in the prior art device. The gate of $T_1$ is connected to switching signal bus 20, and the source of $T_1$ is connected to the information signal bus 16. The drain of $T_1$ is again connected to the power transistor $T_2$, with $T_2$ connected to the individual electrode 23 upon which the electroluminescent layer is disposed. The top electrode 22 again is the uniform electrode covering the entire display panel and is connected to the power supply means 24. The storage capacitor $C_s$ and the opposed contact of power transistor $T_2$ are not connected to a separate common reference signal bus as in the prior art display panel but are instead directly connected to the adjacent switching signal bus, so that for the dotted unit cell of FIG. 3 transistor $T_2$ is connected to adjacent bus $Y_2$. This pattern is continued for each display element with the storage capacitor and the power transistor in each case being connected to the adjacent switch signal bus. The peripheral circuitry at the side of the panel connected to the switching signal buses 20 includes a means for connecting a given switching signal bus to the vertical scan switching signal input means, while connecting all other switching signal buses which are connected to the storage capacitors and the power transistors to a reference signal means which would commonly be grounded. This will permit simultaneous application of the uniform reference signal and the information signal applied via information signal buses to the individual display elements, and also to permit a return path for the current flowing through the electroluminescent layer from the front electrode in the power supply. The common reference signal means would be connected to the power supply to complete this circuit.

The switching signal buses thus perform two functions in the display panel system of the present invention. This is possible because the line-at-a-time address format for such a display panel means that the duty cycle for an individual switching signal bus is relatively low, so that when the adjacent switching signal bus is not being utilized for switching purposes, it can serve the function as a common reference signal bus.

It should be pointed out that the thin film transistor devices utilized in the electronic control circuitry disposed at each picture display element are to be enhancement type devices. Such an enhancement type thin film transistor can be provided by actively controlling the characteristics of the semiconductive layer which is typically cadmium selenide, and by controlling the source and drain contact layers as well as the indium doping layer to provide the desired enhancement mode of operation. By an enhancement type transistor device is meant here that at zero voltage applied between the gate and the source of the transistor there is essentially zero leakage current across the device. This would not be the case with a depletion mode transistor device. The switching transistor $T_1$ must have essentially zero current leakage between its gate and source when the gate which is connected to the switching signal bus has a zero applied voltage, otherwise it will not be possible to store the information signal on the storage capacitor $C_s$. If the power transistor $T_2$ exhibits some leakage current at zero gate voltage, the practical effect will be to permit some excitation of the electroluminescent signal on a continuing basis which would provide a background light level for the individual display element. While this would be undesirable, it is not a critical factor in producing a usable display.

Figure 4:
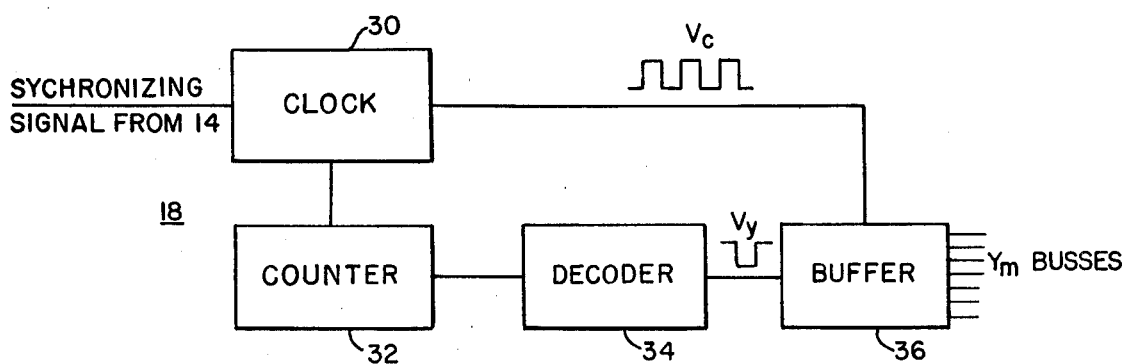
FIG. 4 is a schematic diagram in greater detail of the vertical scan register 18 seen in FIG. 1.

The vertical scan register 18 is seen in greater detail in FIG. 4. The function of vertical scan register 18 is to synchronize the proper information signal with the proper display element of the array, and for line-at-a-time addressing to synchronize transfer of a line of display information stored in the analog video register to the desired line of display elements. Since the $Y_m$ bus bars are time shared to serve as the reference potential return when not being used for switching a line of display elements on, the register 18 must serve to sequentially drive a particular line $Y_m$ with a switching signal while connecting all other Y buses with the reference potential means. A system for achieving this function is shown diagrammatically in FIG. 4, wherein the vertical scan register includes a binary clock 30, counter 32, decoder 34, and buffer 36. The synchronizing signal from the analog video register 14 is fed to the clock 30, with clock pulses fed to the serially connerted counter 32 and decoder 34, which effects the sequential selection of Y lines for switching. The clock pulses $V_c$ here shown as positive step pulses are applied to the buffer 36, as is the switching signal $V_y$ which is here shown as a negative pulse timed to coincide with the positive clock pulse. The buffer has a plurality of output lines equal in number to the $Y_m$ buses and are connected to each $Y_m$ bus bar of the display panel by a suitable panel peripheral connector. The negative pulse $V_y$ which is the output of the decoder is converted in the buffer to a positive switching pulse applied to the selected $Y_m$ bus of the panel, while all other Y buses are connected to a reference signal means which is not shown, which is in turn connected to the power supply 24.

I claim as my invention:

1. A display panel comprising an array of rows and columns of interconnected unit display cells which each comprise:

an electro-optic display medium disposed between two spaced apart electrodes, one electrode of which is light transmissive and common to all the display cells of the panel, with the other electrode being connected to thin film control circuitry consisting of, an information signal addressing transistor the gate of which is connected to a switching signal bus which is connected to a row of display cells, and the source of the information signal transistor is connected to an information signal bus which is connected to a column of display cells, with the drain of the information signal transistor connected to one side of an information signal storage capacitor, and also to the gate of a power transistor, the conductance of the power transistor is controlled as a function of the information signal applied to the power transistor gate, with the power transistor source and drain contacts connected between said other electrode for the display medium and the switching signal bus for the adjacent row of display cells, and wherein the other side of the information storage capacitor is also connected to the same adjacent row switching signal bus, which bus is connectable as a common reference and power return bus when the adjacent switching signal bus is being so used.

2. The display panel set forth in claim 1, wherein the information signal transistor is an enhancement mode device.

3. The display panel set forth in claim 2, wherein the power transistor is an enhancement mode device.

4. A display panel system comprising:

a flat display panel including an array of electro-optic medium elements disposed as rows and columns upon a substrate, and each element having associated therewith thin film electronic control circuitry disposed on the substrate, with a common light transmissive electrode disposed over the electro-optic medium elements and connectable to power supply drive means;

a plurality of display information signal buses disposed on the substrate, one such bus for each column of display elements, with such bus connected to the thin film electronic control circuitry associated with each display element in the column, and connected to information signal drive means; and a plurality of switching signal buses disposed on the substrate, with adjacent switching signal buses connected to the thin film electronic control circuitry associated with each display element in a display element row, and with the total number of switching signal buses being one more than the number of display element rows, such buses are connectable to switching signal drive means for sequentially driving one selected row of display elements in line at a time address mode, with all other switching signal buses being connectable to reference potential means associated with the power supply drive means for the display elements of the adjacent driven row.

5. In a display panel which includes an array of display elements, each of which comprise a display medium interconnected to and drivable by thin film transistor control circuitry at each display element, with orthogonally disposed thin conductive film bus bars interconnecting respectively row and columns of display elements, with a set of the row or column buses serving as switching signal buses and the other set service as the information signal buses, the improvement wherein adjacent switching signal buses are connected to the same row of display element thin film transistor control circuitry so that one of the switching signal buses carries the switching signal for line-at-a-time address of the display elements while the other switching signal bus serves as a common reference and power return bus for the information signal and the display medium drive signal.

* * * * *